H. D. REMSEN.
MACHINE FOR MAKING NUT BLANKS.
APPLICATION FILED APR. 21, 1915.

1,217,501.

Patented Feb. 27, 1917.
3 SHEETS—SHEET 1.

H. D. REMSEN.
MACHINE FOR MAKING NUT BLANKS.
APPLICATION FILED APR. 21, 1915.

1,217,501.

Patented Feb. 27, 1917.
3 SHEETS—SHEET 2.

WITNESSES
C. F. Polk
J. Thomson

INVENTOR
H. D. Remsen
BY
Duell, Warfield & Duell
ATTORNEYS

H. D. REMSEN.
MACHINE FOR MAKING NUT BLANKS.
APPLICATION FILED APR. 21, 1915.

1,217,501.

Patented Feb. 27, 1917.
3 SHEETS—SHEET 3.

WITNESSES
C. F. Volk.
J. Thomson.

INVENTOR
H. D. Remsen
BY
Dull, Warfield & Dull
ATTORNEYS

UNITED STATES PATENT OFFICE.

HERBERT D. REMSEN, OF PORT CHESTER, NEW YORK, ASSIGNOR TO RUSSELL, BURDSALL & WARD BOLT AND NUT COMPANY, OF PORT CHESTER, NEW YORK, A CORPORATION OF NEW YORK.

MACHINE FOR MAKING NUT-BLANKS.

1,217,501. Specification of Letters Patent. Patented Feb. 27, 1917.

Application filed April 21, 1915. Serial No. 22,772.

*To all whom it may concern:*

Be it known that I, HERBERT D. REMSEN, a citizen of the United States, residing at Port Chester, in the county of Westchester and State of New York, have invented certain new and useful Improvements in Machines for Making Nut-Blanks, of which the following is a full, clear, and exact description, such as will enable others skilled in the art to which it appertains to make and use the same.

This invention relates to nut-making machines, and with respect to its more specific features, to machines of the character referred to, in which the stock is automatically moved into position to be operated upon by the punches and dies.

One of the objects of the invention is the provision of an efficient mechanism whereby stock bars may be consumed so as to leave, as scrap, only a small portion of the bars, if any.

Another object of the invention is the provision of a practical and simple device for the support of the bar to be punched, which device lends itself readily to the automatic discharge of the portion of the bar left as scrap.

Other objects will be in part obvious and in part pointed out hereinafter.

The invention accordingly consists in the features of construction, combinations of elements and arrangement of parts which will be exemplified in the construction hereinafter set forth, and the scope of the application of which will be indicated in the following claims.

In the accompanying drawings, forming a part of this specification, and wherein similar reference characters refer to similar parts throughout the several views,—

Figs. 5 and 6 are detail views illustrating the mounting of the perforating punch upon the reciprocatory punch head.

Figure 1:
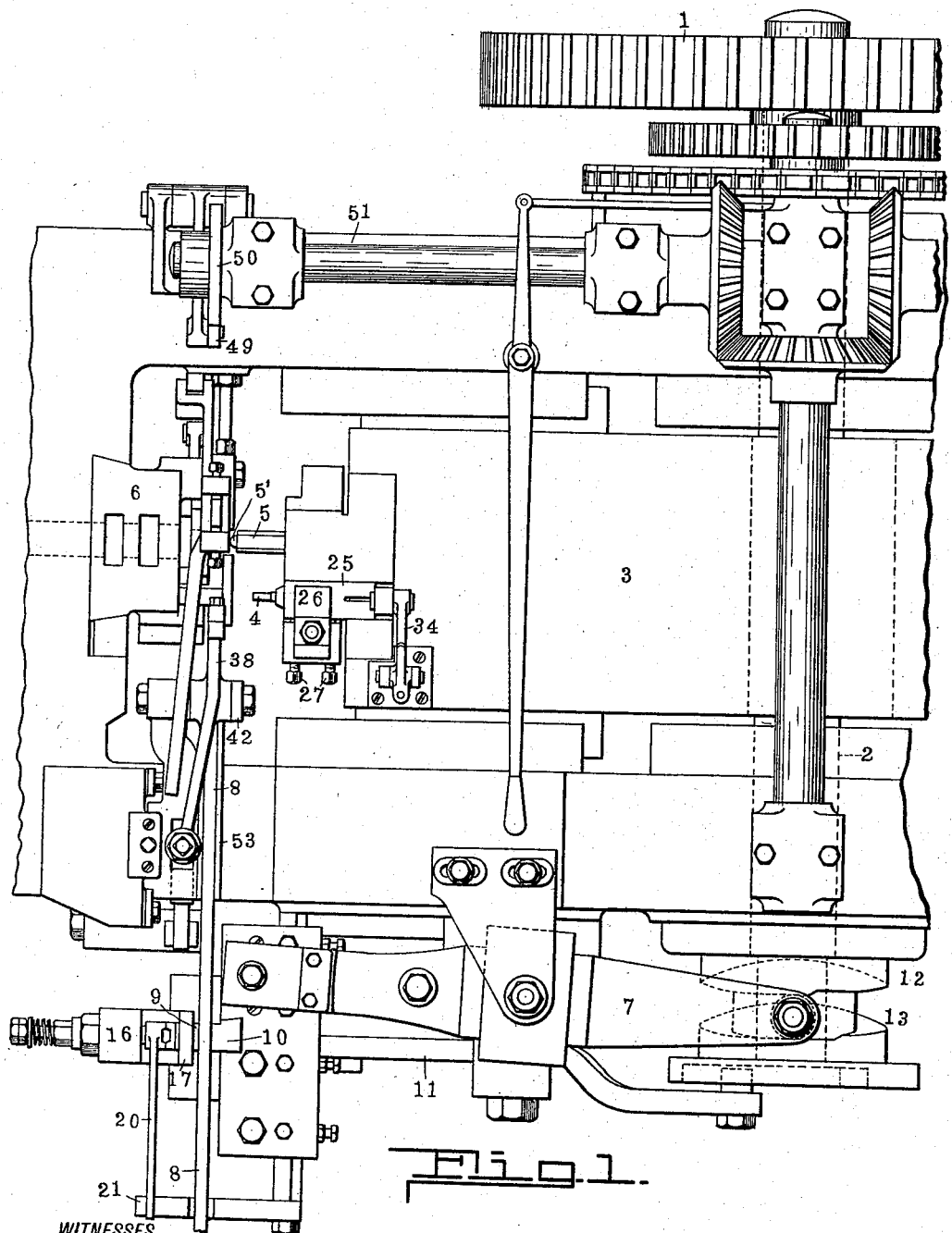
Figure 1 represents a plan of so much of an apparatus as may be required to disclose the invention.
Figure 2:
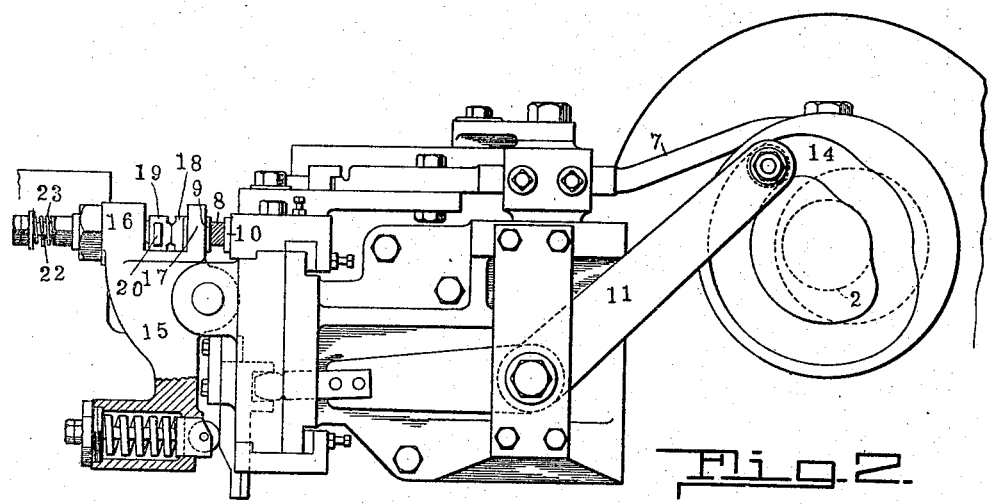
Fig. 2 is a side view of the stock bar feeding mechanism, the same being partly in section for a clearer disclosure.

This invention more particularly relates to an improvement on the double-acting automatic nut blank machine disclosed in Patent No. 1,088,192 of February 24, 1914, and has more particularly to do with a bar support, and the means whereby scrap is disposed of. Aside from the differences in construction herein referred to, the construction of the complete machine is to be regarded as similar to that disclosed in the patent above mentioned, to which patent reference may be made for a fuller disclosure of the specific mechanisms and operations employed. Like the patent, the improved machine involves a main driving gear 1, which may be driven from any suitable source of power and which in turn is adapted to continuously rotate a main driving shaft 2. The numeral 3 indicates a reciprocatory punch head carrying a perforating punch 4 and a shearing punch 5, the reciprocation of the head 3 being effected by a sliding block operative connection with the main driving shaft 2, as explained in the patent. In the present embodiment, the shearing punch is provided with a pilot pin 5', which assists in alining the bar with this punch. The numeral 6 represents a die block supporting suitable dies opposite the punches, and as the punches advance toward the dies, the punch 5 will shear off a perforated nut blank section from the end of a stock bar and the punch 4 will perforate the bar at a predetermined preceding part of the bar. The numeral 7 indicates a rock lever suitably fulcrumed on the machine frame, which lever at one end is suitably connected with a reciprocatory stock bar feeding vise or gripper so that the reciprocations of the lever 7 will feed a stock bar 8 at intervals to the punching mechanism. The numerals 9 and 10 indicate the gripping jaws of the vise mechanism, which jaws are caused to grip the stock bar 8 through the instrumentality of a rock lever 11. The reciprocatory movements of the rock levers 7 and 11 are effected through the instrumentality of a member 12, splined to the main driving shaft 2 and having a circumferential cam groove 13 to coöperate with the lever 7 and an end or face cam groove 14 for coöperation with the lever 11. The above construction being similar to that of the patent referred to, it is unnecessary to further specifically describe the same. For convenience it may be noted, however, that upon rotation of the driving shaft 2, the punches 4 and 5 will be reciprocated toward and from the path of the bar to be operated upon, the jaws 9 and 10 will be caused to grip the stock bar, and will thereupon be moved by the lever 7 to advance the stock bar 8 into coöperative relation with the punches, subsequently releasing the bar and returning for a new grip. A nut blank section having been sheared from the advanced end of the bar 8 by the punch 5, a slight retrograde movement of the bar 8 is effected through the instrumentality of the cam groove 13, after which the punch 4 perforates the stock bar at a predetermined point.

It may also be noted that the present invention, when viewed in some aspects, involves a construction whereby the vise mechanism may be manipulated to cut out the gripping operation of the vise while the machine is running, so that, though the vise mechanism may continue its reciprocation in a bar advancing manner, the jaws 9 and 10 do not grip the stock bar. This cut-out is provided for by mounting one of the jaws of the vise mechanism in a movable manner on its carrier. In the present instance, it will be noted that the rocking member of lever 15 of the vise mechanism provides two integral lugs 16 and 17, which are spaced apart, as shown. Quite snugly, yet slidably fitting within a recess in the lug 17, is the vise block or gripper jaw 9, which is preferably backed by means of a block 18, which in turn is positively positioned by means of the hub 19 of the hand lever 20. The block 18 and the hub 19 provide counterpart cams in their adjacent faces, which cams are so constructed that when the hand lever 20 is swung so as to rest on the horizontal rest 21, the block 18 will be crowded outwardly, whereas, when the arm 20 is moved through 90 degrees, the block 18 may be drawn back somewhat by means of the shaft 22 and the spring 23, thereby easing up the pressure between the vise block 9 and the stock bar.

By this arrangement, when it is desired to stop the feeding of the stock bar temporarily, without stopping the entire machine, the operator, by lifting the handle 20, can release the vise jaws from the stock bar, irrespective of the position of the feeding mechanism, and thereupon the freed stock bar can be manually adjusted in position. Upon then turning the handle 20, the machine will be ready to resume its cycle of operations.

As will hereinafter appear, it is desirable at times to cut off the effective operation of the perforating punch 4, and, to permit of this, said punch is mounted upon the reciprocatory head 3 in such manner that it may be permitted, at times, to reciprocate idly, that is, without performing a punching operation. To this end, the reciprocatory head 3 is recessed, as at 24, and a punch supporting block 25 is positioned in said recess and held therein, so as to be capable of adjustment, by means of a clamping bracket 26 and a clamping bolt 27. In a cylindrical bearing in the block 25 rests a cored bearing piece 28, and the perforating punch 4 lies in the core of the bearing piece 28 and is fixed therein by means of a wedge 29, engaging a slot in the piece 28 and in the shank of the punch. When the wedge 29 is driven in, the tapered section 30 of the punch is pressed against the tapered face 31 of the core of the piece 28, the punch and bearing piece being thus removably fixed to each other. The punch 4 has a rear head 32, and a positioning member 33, pivotally connected to a hand lever 34 and having an inclined surface 35, is adapted to be moved into and out of position back of the head 32 of the punch. When the positioning member is in position opposite said head, as illustrated in Fig. 6, the punch is fixed relative to the reciprocatory head and will then perform a punching operation upon a bar. By manipulating the lever 34, the positioning member 33 may be removed from position back of the punch 4, whereupon, when the punch strikes the bar to be punched, it will not penetrate but will lie idly thereagainst, as will be plain. The punches 4 and 5 are spaced apart in the direction of the path of feed of the bar to be punched, and the shearing punch projects in advance of the perforating punch so as to perform its operation upon the bar ahead of the perforating punch.

It will facilitate the disclosure of the invention to here describe, in a general manner, the operation of feeding and punching the bar of stock. The operator manipulates the lever 20, so as to permit the stock bar 8 to pass between the gripper jaws 9 and 10, and said stock bar is thrust therebetween, its advanced end coming to position opposite the punches 4 and 5. The extreme advanced position of the stock bar may be determined by means of a stop disposed at the end of the path of feed, as will be hereinafter explained. The lever 20 is then turned so as to cause the jaws 9 and 10 to grip the bar. As the machine operates the reciprocation of the head 3 will cause the punches to advance and shear a nut blank section from the front end of the bar, and perforate the bar in rear of said front end. Eventually the perforated sections will be successively positioned opposite the shearing punch and said perforated sections will be sheared from the bar, one after the other, and pressed through the dies.

It oftentimes happens that commercial stock bars are warped or irregular in shape, and, on account of this variation, the front end of the stock bar may not be accurately alined with the punches, transversely of the plane in which they operate. The centering mechanism, comprising the centering fingers 36 and 37, is therefore provided for the purpose of correctly alining the fore end of the bar relative to the punches. This centering mechanism is disclosed in the patent hereinbefore referred to, and may be briefly here described as composed of two strong rock arms 38 and 39, fulcrumed at 40 and 41, and connected by strong links 42, the actuating ends of these levers comprising tongs 43 and 44 coöperating with a grooved cam block 45, which is caused to reciprocate by a rock lever 46, pivotally connected to the cam block and also to a rod 47, which rod is in turn pivotally connected to a lever 48 having a roller 49 coöperating with a cam 50 carried by a continuously rotating cam shaft 51. Just before the punches operate upon the bar, the centering fingers are operated by the mechanism referred to so as to position that portion of the bar opposite the punches in correct alinement transversely of the plane of operation of the punches, whereupon the clamping plate or member 52 is operated, as explained in the patent, to clamp the bar against the dies or die block during the punching operation.

As the bar 8 is fed to the punches in successive steps by the operation of the vise mechanism its rear end eventually passes into the machine and beyond the vise mechanism and said rear end is guided in a channel 53, its foremost end, however, projecting beyond the front end of the channel, and also as will be clear, inwardly beyond the vise. Just before, or immediately upon, the passage of the rear end of the stock bar beyond the gripping jaws of the vise mechanism the operator introduces the succeeding stock bar into the machine in a position so that its front end abuts the rear end of the preceding bar, and the successive advance movements of the second bar forces the preceding bar to similarly advance at intervals so that the shearing and punching operations may be continued on the preceding bar. It will be clear, however, that under the conditions just stated the preceding bar, which may be said to be then in a "floating" condition, will pass beyond the channel 53, and thereafter it may not be positively held or positioned accurately relative to the punches so that a continued operation upon this floating portion or end of the bar may result in an inaccurate product. For this reason it has been customary to regard so much of the rear end of the bar as scrap and to remove it from the machine, the succeeding bar being then moved by hand so as to place its front end opposite the punches. The stopping of the machine at such short intervals for the removal of this scrap is, of course, detrimental to economic operation, and moreover, such piece of scrap is relatively large and may comprise material sufficient to furnish several nut blanks. One of the main objects of the present invention is to avoid the stopping of the machine and to utilize the floating end of the bar to a greater extent in the production of nut blanks, so that the scrap of bar formed shall be quite small, if any is formed at all. Further, it is found that, in the operation of forming nut blanks, rough edges or fins oftentimes occur at the end of the bar, and perhaps the scrap may tend to catch or hang in the machine, either in the path of feed or at some other point, so as to endanger the operation of the machine or choke up the scrap passageway or opening.

The numeral 54 indicates an arm adjustably connected to a manually operated lever 55, which lever is fulcrumed on the frame of the machine at 56. The lower end of the arm 54 provides a stop 57 to limit the advance movement of the bar, said stop being disposed opposite the path of the advancing end of the stock bar. By manipulating the lever 55 the stop 57 may be moved from stopping position, and it will be noted that the disposition of the stop 57 relative to the axis 56 is such that, upon lifting the lever 55, said stop immediately moves away from the end of the bar.

In the present embodiment of the invention the scrap is discharged from the path of feed of the bar by gravity, the bar being preferably fed in a horizontal path, the parts of the apparatus being so located relatively to each other as to provide a passageway or opening 58 beneath the path of feed for the discharge of scrap and preferably in advance of the centering fingers 36 and 37. The numeral 59 indicates a member which is adapted to be disposed beneath the stock bar and serves to support the bar above the opening 58 and guide the same in its passage across the scrap opening. In the present embodiment the member 59 is comprised in a rock arm 60 fulcrumed on the frame at 61, the member 59 constituting an outer plain face of this rock arm, which face has sufficient extent longitudinally of the path of feed to form a substantial supporting face for the bar. The supporting portion of the arm 60, when in supporting position, is preferably designed to be in gravitative alinement with the opening 58, and to intersect said opening. Coöperating with the supporting member 59 is another member, and these two members are designed to aline the bar relative to the plane of operation of the punches, said coöperative member being preferably comprised in a shoulder 62 formed on the clamping plate 52, the face 59 and the shoulder 62 forming, as it were, a passageway through which the stock bar passes.

It will now be perceived that as the stock bars are fed at intervals to the punches they will successively pass between the support 59 and the shoulder 62. When the floating end of the foremost bar is freed from the vise and is advanced by the movement of the succeeding bar, the member 59 forms a support adjacent the punches and the scrap opening so that the rear end of the floating bar may be advanced close to the near side of the shearing punch and even beyond the perforating punch. In this wise the scrap of bar left will be quite small.

Figure 3:
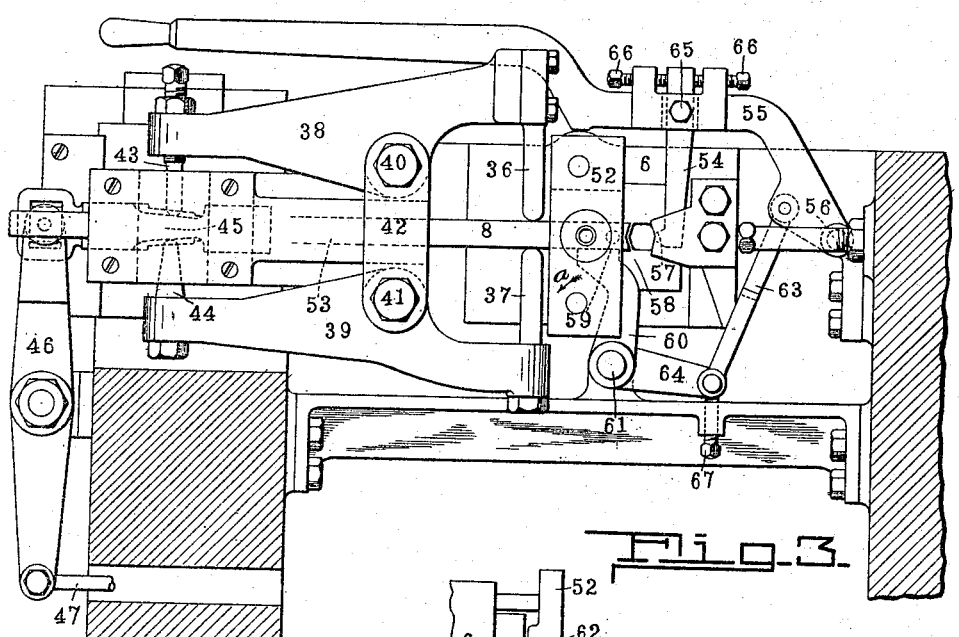
Fig. 3 represents a side elevation of a portion of the mechanism, the same being partly in section for a clearer disclosure of internal parts.
Figure 4:
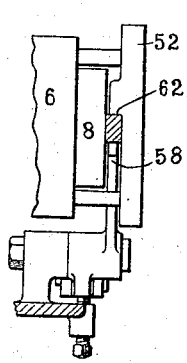
Fig. 4 is a detail end view of a portion of the mechanism shown in Fig. 3.
Figure 5:
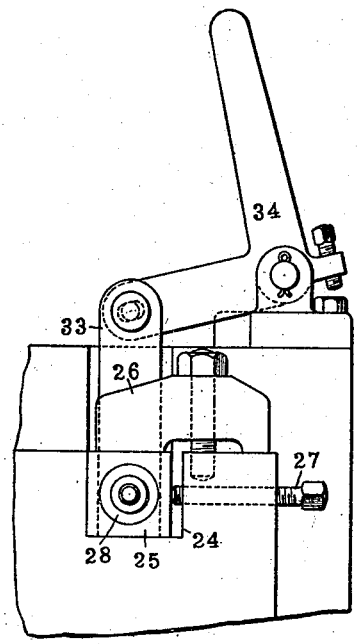
Figure 7:
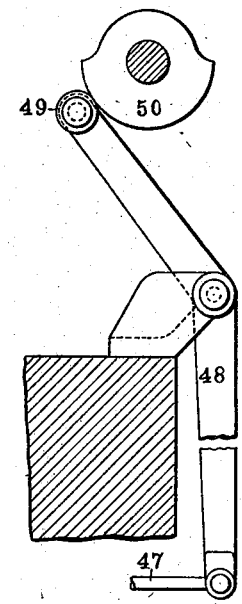
Fig. 7 is a view of a portion of the operating means for certain centering devices which may be employed in the machine.
Figure 8:
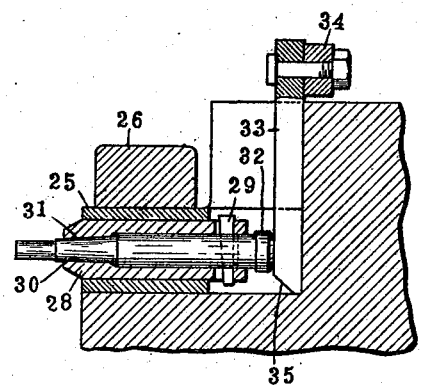

It rarely happens that the joint formed by the abutting faces of two successive bars is disposed on a line centrally between successive nut sections, and hence the scrap of bar left is generally longer than a single nut section, its rear end generally resting at the front of the face 59 and its front end usually abutting the stop 57. To assure the removal of this scrap of bar, provision is made for moving the supporting member 59 relatively to this piece of scrap, and this movement takes place in a direction to displace the supporting member 59 from the scrap opening so as to increase its distance from the stop 57. As shown in Fig. 3, this movement takes place in the direction indicated by the arrow $a$ upon rotation of the arm 60 around the fulcrum 61. The movement of the arm 60 so as to move the face 59 into and out of supporting position for the bar, as explained heretofore, may be accomplished by any suitable operative devices, but it is preferred to utilize the lever 55 for such purpose, so that a single lever may be adapted to accomplish the movements of both the arm 60 and the stop 57. The manually movable lever 55 is pivotally connected to one end of a link 63, which latter is in turn pivotally connected to an arm 64 fastened to the pivotal axis of the rock lever 60, the disposition of the connections between the elements 60 and 55 being such that, upon raising the lever 55, the stop 57 will rise, and, owing to its relation to the pivotal axis 56, will recede from the end of the piece of scrap and at the same time the arm 60 will move around its pivotal axis 61 in the opposite direction, the member 59 and the stop 57 being thus manually operable together, and the distance between them increasing as they move from their respective positions of stop and support.

Accurate positioning of the stop 57 may be effected by adjusting the arm 54 around its pivotal connection 65 with the lever 55, screws 66 being employed to lock the arm 54 in adjusted position. The numeral 67 indicates a set screw, against which the arm 64 may rest, and which is adapted to adjust the lower position of this arm within moderate limits.

The operation of the apparatus will be understood from the above description, but a brief résumé thereof is appended. The lever 20 is raised and a stock bar is introduced into the machine, passing between the gripper jaws 9 and 10, through the channel piece 53, between the centering fingers 36 and 37, and between the end support 59 and the shoulder 62, the front end of the bar being abutted against the stop 57. The lever 20 is thrown so that the jaws 9 and 10 will grip the bar, at proper times, and the operation of the mechanism will cause the punches to respectively shear a blank from the front end of the bar and perforate the bar, the perforated blanks being pressed through the dies, all as explained in the patent hereinbefore referred to. When the rear end of the bar being operated upon approximates the gripping jaws, another bar is introduced and abutted against the rear end of the preceding bar. Eventually the grippers grasp the front end of this second bar and advance it at intervals, pushing the now "floating" bar, or "floating" end of the preceding bar, toward the punching mechanism. When the rear end of the floating bar emerges from the trackway, said floating portion will be supported by the member 59, assisted by the shoulder 62, so that this floating portion may be almost entirely consumed by the punches. As the succeeding bar arrives at the perforating punch it will be perforated, and at the proper time the lever 55 is raised, causing the member 59 to move from supporting position, and this movement permits the piece of scrap to gravitate into said opening, whence it eventually finds its way out of the machine. The operator usually will place a mark on the succeeding bars at a distance from their front ends, so that when this mark registers with a predetermined portion of the machine he will know that it is time to permit the ejection of the scrap of the floating bar. Whereupon he operates the lever 55, as just explained. At the same time further automatic feed of the succeeding bar is temporarily cut out by raising the lever 20. The scrap having been removed from the path of feed, the operator advances the remaining bar by hand until the end perforation is opposite the pilot pin of the shearing punch. This position of the bar may also be determined by setting the mark on the bar to a predetermined position. During these manipulations of the bar and the cut-out the head 3 may continue to reciprocate, but in order that the succeeding bar may not be perforated at an undesigned point, the lever 34 is thrown in a direction to lift the positioning piece 33 from behind the head of the perforating punch. The new bar being now set in proper position, the several hand levers referred to are lowered, and punching is thereby resumed.

Thus by the above described construction are accomplished, among others, the objects hereinbefore referred to.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

It is also to be understood that the language used in the following claims is intended to cover all of the generic and specific features of the invention herein described and all statements of the scope of the invention, which, as a matter of language, might be said to fall therebetween.

Having described my invention, what I claim as new and desire to secure by Letters Patent is:

1. In an apparatus of the character described, in combination, punching mechanism, bar-feeding mechanism, said apparatus having an opening for the discharge of scrap, a movable member adapted to support a floating end of the bar and guide it across said opening, and means adapted to move said member out of bar-supporting position.

2. In an apparatus of the character described, in combination, punching mechanism, bar-feeding mechanism, said apparatus having an opening for the discharge of scrap, a movable member adapted to support a floating end of the bar and guide it across said opening, and a stop to limit the advance movement of the bar under the influence of the feeding mechanism.

3. In an apparatus of the character described, in combination, punching mechanism, bar-feeding mechanism, said apparatus having an opening for the discharge of scrap, a movable member adapted to support a floating end of the bar and guide it across said opening, and a member adapted to coöperate with said support to aline said bar with the punching mechanism.

4. In an apparatus of the character described, in combination, punching mechanism, bar-feeding mechanism, said apparatus having an opening for the discharge of scrap, a movable member adapted to support a floating end of the bar and guide it across said opening, a stop to limit the advance movement of the bar under the influence of the feeding mechanism, and a member adapted to coöperate with said support to aline said bar with the punching mechanism.

5. In an apparatus of the character described, in combination, punching mechanism, bar-feeding mechanism comprising a reciprocatory vise, manual means operable to cut out the gripping operation of the vise while permitting reciprocation thereof, said apparatus having an opening for the discharge of scrap, and a movable member adapted to support a floating end of the bar and guide it across said opening.

6. In an apparatus of the character described, in combination, punching mechanism, bar-feeding mechanism, a manually operable stop adapted to limit the advance movement of the bar, said apparatus having an opening for the discharge of scrap, and a manually movable member adapted to support a floating end of the bar and guide it across said opening.

7. In an apparatus of the character described, in combination, punching mechanism, bar-feeding mechanism, a manually operable stop adapted to limit the advance movement of the bar, said apparatus having an opening for the discharge of scrap, a manually movable member adapted to support a floating end of the bar and guide it across said opening, and means connecting said stop and said supporting member whereby they are manually operable together.

8. In an apparatus of the character described, in combination, punching mechanism, bar-feeding mechanism, said apparatus having an opening for the discharge of scrap, movable bar supporting means adapted to intersect said opening, means adapted to move said supporting means out of bar-supporting position and a stop to limit the advance movement of the bar.

9. In an apparatus of the character described, in combination, punching mechanism, bar-feeding mechanism, said apparatus having an opening for the discharge of scrap, movable bar supporting means adapted to intersect said opening, and a member adapted to coöperate with said movable means to aline said bar with the punching mechanism.

10. In an apparatus of the character described, in combination, punching mechanism, bar-feeding mechanism, said apparatus having an opening for the discharge of scrap, movable bar supporting means adapted to intersect said opening, a stop to limit the advance movement of the bar, and a member adapted to coöperate with said movable means to aline said bar with the punching mechanism.

11. In an apparatus of the character described, in combination, punching mechanism, bar-feeding mechanism comprising a reciprocatory vise, manual means operable to cut out the gripping operation of said vise while it is reciprocating, said apparatus having an opening for the discharge of scrap, and movable bar supporting means adapted to intersect said opening.

12. In an apparatus of the character described, in combination, punching mechanism, bar-feeding mechanism, a manually operable stop adapted to limit the advance movement of the bar, said apparatus having an opening for the discharge of scrap, and manually movable bar supporting means adapted to be disposed in gravitative alinement with said opening.

13. In an apparatus of the character described, in combination, punching mechanism, bar-feeding mechanism, a manually operable stop adapted to limit the advance movement of the bar, said apparatus having an opening for the discharge of scrap, manually movable bar supporting means adapted to be disposed in gravitative alinement with said opening, and means connecting said stop and said movable means whereby they are manually operable together.

14. In an apparatus of the character described, in combination, punching mechanism comprising a perforating punch and a shearing punch spaced apart, manual means to cut off effective operation of said perforating punch, bar-feeding mechanism, said apparatus having an opening for the discharge of scrap, and movable bar supporting means adapted to intersect said opening.

15. In an apparatus of the character described, in combination, punching mechanism comprising a perforating punch and a shearing punch spaced apart, manual means to cut off effective operation of said perforating punch, bar-feeding mechanism comprising a reciprocatory vise, manual means to cut out the gripping operation of said vise while it is reciprocating, said apparatus having an opening for the discharge of scrap, and movable bar supporting means adapted to intersect said opening.

16. In an apparatus of the character described, in combination, punching mechanism, bar-feeding mechanism, said apparatus having an opening for the discharge of scrap, and a movable member adapted to be disposed in gravitative alinement with said opening and support said bar.

17. In an apparatus of the character described, in combination, punching mechanism, bar-feeding mechanism, said apparatus having an opening for the discharge of scrap, a movable member adapted to be disposed in gravitative alinement with said opening and support said bar and a stop to limit the advance movement of said bar.

18. In an apparatus of the character described, in combination, punching mechanism, bar-feeding mechanism, said apparatus having an opening for the discharge of scrap, a movable member adapted to support said bar above said opening, and a member adapted to coöperate with said movable member to aline said bar with the punching mechanism.

19. In an apparatus of the character described, in combination, punching mechanism, bar-feeding mechanism, said apparatus having an opening for the discharge of scrap, a movable member adapted to support said bar above said opening, a stop to limit the advance movement of said bar, and a member adapted to coöperate with said movable member to aline said bar with the punching mechanism.

20. In an apparatus of the character described, in combination, punching mechanism, bar-feeding mechanism comprising a vise adapted to intermittently advance the bar toward the punching mechanism, manual means adapted to cut out the gripping operation of the vise on the bar without cutting out its bar-advancing movement, said apparatus having an opening for the discharge of scrap, and a movable member adapted to support said bar above said opening.

21. In an apparatus of the character described, in combination, punching mechanism, bar-feeding mechanism, a movable stop in the path of the bar, a movable member adapted to support said bar adjacent the punching mechanism, and manually operative means adapted to move said stop and said support.

22. In an apparatus of the character described, in combination, punching mechanism, bar-feeding mechanism, a movable stop in the path of the bar, a manually operative lever on which said stop is mounted, a rock arm adapted to move into and out of supporting relation to the bar to be punched, and a link connecting said lever and said rock arm.

23. In an apparatus of the character described, in combination, punching mechanism, bar-feeding mechanism, a movable stop in the path of the bar, a manually operative lever on which said stop is mounted, a rock arm adapted to move into and out of supporting relation to the bar to be punched, and a link connecting said lever and said rock arm, said stop and said arm being so arranged that the distance between them increases as they are moved from stopping and supporting positions respectively.

24. In an apparatus of the character described, in combination, punching mechanism, bar feeding mechanism, centering mechanism intermediate the feeding mechanism and the punching mechanism, and means adapted to be manually moved into and out of bar-supporting position between said centering mechanism and the end of the path of feed of the bar.

25. In an apparatus of the character described, in combination, punching mechanism, means adapted to intermittently grip a bar of stock and intermittently feed said bar to said punching mechanism, a bar support, and manual means adapted to move said support into and out of bar-supporting position between said punching mechanism and said feeding means.

26. In an apparatus of the character described, in combination, punching mechanism, means adapted to intermittently grip a bar of stock and intermittently feed said bar to said punching mechanism, a bar support, manual means adapted to move said support into and out of bar supporting position between said punching mechanism and said feeding means, and a pair of centering fingers automatically operative to contact opposite sides of the bar between said support and said feeding mechanism.

27. In an apparatus of the character described, in combination, punching mechanism, means adapted to intermittently grip a bar of stock and intermittently feed said bar to said punching mechanism, a bar support, manual means adapted to move said support into and out of bar-supporting position between said punching mechanism and said feeding means, a stop to limit the advance movement of said bar, and connections between said stop and said support whereby one is movable with the other into and out of supporting and limiting position, respectively.

In testimony whereof I affix my signature, in the presence of two witnesses.

HERBERT D. REMSEN.

Witnesses:
E. BURDSALL,
HARRY C. MUNSON.

Copies of this patent may be obtained for five cents each, by addressing the "Commissioner of Patents, Washington, D. C."